(12) United States Patent
Schuler et al.

(10) Patent No.: US 7,494,152 B2
(45) Date of Patent: Feb. 24, 2009

(54) SAFETY ARRANGEMENT (75) Inventors: Harold Schuler, Niederroth (DE);
Konrad Gottschalk, Freising (DE)

(73) Assignee: Autoliv Development AB, Vargarda (SE)

( * ) Notice: Subject to any disclaimer, the term of this patent is extended or adjusted under 35 U.S.C. 154(b) by 294 days.

(21) Appl. No.: 10/579,962

(22) PCT Filed: Nov. 15, 2004

(86) PCT No.: PCT/SE2004/001655

§ 371 (c)(1),
(2), (4) Date: May 18, 2006

(87) PCT Pub. No.: WO2005/049387

PCT Pub. Date: Jun. 2, 2005

(65) Prior Publication Data
US 2007/0102908 A1 May 10, 2007

(30) Foreign Application Priority Data
Nov. 19, 2003 (GB) ................... 0326939.6

(51) Int. Cl.
*B60R 21/045* (2006.01)
(52) U.S. Cl. ...................... 280/752; 280/753
(58) Field of Classification Search ......... 280/751–753, 280/728.1, 730.1
See application file for complete search history.

(56) References Cited

U.S. PATENT DOCUMENTS

| 4,518,183 | A |   | 5/1985  | Lee |          |
|-----------|---|---|---------|--------------|----------|
| 4,951,963 | A | * | 8/1990  | Behr et al.  | 280/753  |
| 6,283,508 | B1|   | 9/2001  | Nouwynck et al. | |
| 6,338,501 | B1|   | 1/2002  | Heilig et al. | |
| 6,641,166 | B2|   | 11/2003 | Browne et al. | |
| 7,048,298 | B2| * | 5/2006  | Arwood et al. | 280/730.1 |
| 7,207,598 | B2| * | 4/2007  | Tajima et al. | 280/752 |
| 2002/0153716 | A1 | * | 10/2002 | Muller et al. | 280/735 |
| 2003/0001372 | A1 |   | 1/2003  | Browne et al. | |
| 2003/0173120 | A1 | * | 9/2003  | Desrochers et al. | 177/144 |

FOREIGN PATENT DOCUMENTS

| DE | 40 02 448 A1 | 8/1990 |
| DE | 100 58 430 A1 | 9/2001 |
| EP | 0 421 572 A3 | 4/1991 |
| GB | 1 298 538 A | 12/1972 |
| GB | 2 373 218 A | 9/2002 |
| WO | WO-01/23225 A1 | 4/2001 |

* cited by examiner

*Primary Examiner*—John Q. Nguyen
*Assistant Examiner*—Drew J. Brown
(74) *Attorney, Agent, or Firm*—Harness, Dickey & Pierce, P.L.C.

(57) ABSTRACT

A safety arrangement for use in a motor vehicle includes a blocking unit (6) and a drive (7, 8, 9, 10) to drive the blocking unit (6) from a position where it is flush with the dashboard (4) to a forward position where it will block movement of the knees of an occupant of a seat (1). A timing arrangement (17) is provided which controls the drive to return the blocking unit to an initial position after a predetermined period of time. An energy-absorbing element, which may be an air-bag (12) absorbs energy as the blocking unit (6) is moved from the operative position by a force applied to the blocking unit by the knees of a seat occupant.

19 Claims, 7 Drawing Sheets

SAFETY ARRANGEMENT

THE PRESENT INVENTION relates to a safety arrangement, and more particularly relates to a safety arrangement for use in a motor vehicle.

It has been proposed to provide a safety arrangement for use in a motor vehicle, to protect an occupant of the vehicle in the event that an accident occurs, the arrangement being situated near the knees of a vehicle occupant. In the event of an accident the safety arrangement is actuated to restrain forward movement of the occupant's knees. If the safety arrangement is able to restrain the movement of the occupant's knees in this way the occupant may be prevented from moving and striking part of the vehicle, potentially causing injury.

A safety arrangement of this type is disclosed in U.S. Pat. No. 6,338,501. This arrangement incorporates an air-bag which is situated behind a moveable plate in part of the vehicle body that is adjacent the knees of a vehicle occupant. In the event that an accident occurs the air-bag is inflated, moving the plate outwardly so that the plate is brought into contact with the knees of the vehicle occupant. The air-bag thus forms a cushion which can dissipate energy as the knees of the occupant presses against the plate, deflating the air-bag. After this safety arrangement has been actuated the air-bag must be replaced, at the expense and inconvenience of the vehicle owner. Also, this safety arrangement could potentially injure a vehicle occupant, as during the initial stages of inflation of the air-bag it expands rapidly, thus accelerating the plate quickly towards the knees of the occupant. The plate may thus strike the knees of the occupant with a substantial velocity.

Another safety arrangement is disclosed in DE 10058430. This safety arrangement incorporates a plate which is driven by an electric motor so that the plate is moved to a position near the knees of a vehicle occupant, in response to a signal from a pre-crash sensor, which senses that an accident may be about to occur. This is necessary, as the electric motor is relatively slow and must move the plate into a knee restraining position before the accident occurs. Pre-crash sensors such as the type disclosed in this document are often unreliable and falsely detect potential accidents. Also, the plate incorporated in this arrangement does not provide a cushioning effect to absorb energy from the occupant in the event of an accident.

The present invention seeks to provide an improved safety arrangement.

According to this invention there is provided a safety arrangement for use in a motor vehicle, the safety arrangement incorporating a blocking unit and a reversible drive to drive the blocking unit, in response to a first signal, from an initial position to an operative position, the drive being associated with a timing arrangement to control the drive to return the blocking unit to the initial position after a pre-determined period of time, the arrangement incorporating an energy absorbing element operative to absorb energy as the blocking unit is moved from the operative position by an applied force.

Conveniently the energy absorbing element is an inflatable element, that is inflated in response to a second signal.

According to another aspect of this invention there is provided a safety arrangement for use in a motor vehicle, the safety arrangement incorporating a blocking unit and a reversible drive to drive the blocking unit, in response to a first signal, from an initial position to an operative position, the drive being associated with a timing arrangement to control the drive to return the blocking unit to the initial position after a predetermined period of time, the arrangement incorporating an energy absorbing element operative to absorb energy as the blocking unit is moved from the operative position by an applied force, wherein the energy absorbing element is an inflatable element that is inflated in response to a second signal.

Preferably a pre-crash sensor is provided and the first drive signal is generated in response to the sensing of a potential crash by the pre-crash sensor.

In one embodiment the reversible drive incorporates a rack.

In an alternative embodiment the reversible drive incorporates a piston and cylinder unit.

Preferably the blocking element incorporates a contact sensor to supply a signal when the blocking element is moved into contact with an object to stop the blocking unit from being driven further towards the operative position.

Advantageously a crash sensor is provided and the second signal is generated in response to the sensing of a crash by the crash sensor.

Conveniently the crash sensor indicates the degree of severity of a crash.

Advantageously the safety arrangement provides front protection for a seat occupant in the event of a crash.

Conveniently the seat is provided with a sensor to sense a parameter.

Conveniently the sensor is able to detect the presence and weight of an occupant of the seat.

Preferably the sensor is a seat position sensor, able to sense the position of the seat in the direction of the longitudinal axis of the vehicle.

Conveniently the inflatable element is inflated by a multistage gas generator, the gas generator being controlled by a controller responsive to sensed parameters.

The sensed parameters may include one or more of the degree of severity of the crash, the presence and weight of an occupant of the seat and the position of the seat in the direction of the longitudinal axis of the vehicle.

In one embodiment of the invention the energy absorbing element is part of the drive. The energy may thus, in preferred embodiments of the invention, be absorbed by, for example, the rack incorporated in the reversible drive or a piston and cylinder unit incorporated in the reversible drive. In such an embodiment the air-bag may be omitted.

In order that the invention may be more readily understood, and so that further features thereof may be appreciated, embodiments of the invention will now be described, by way of example, with reference to the accompanying drawings in which.

Figure 1:
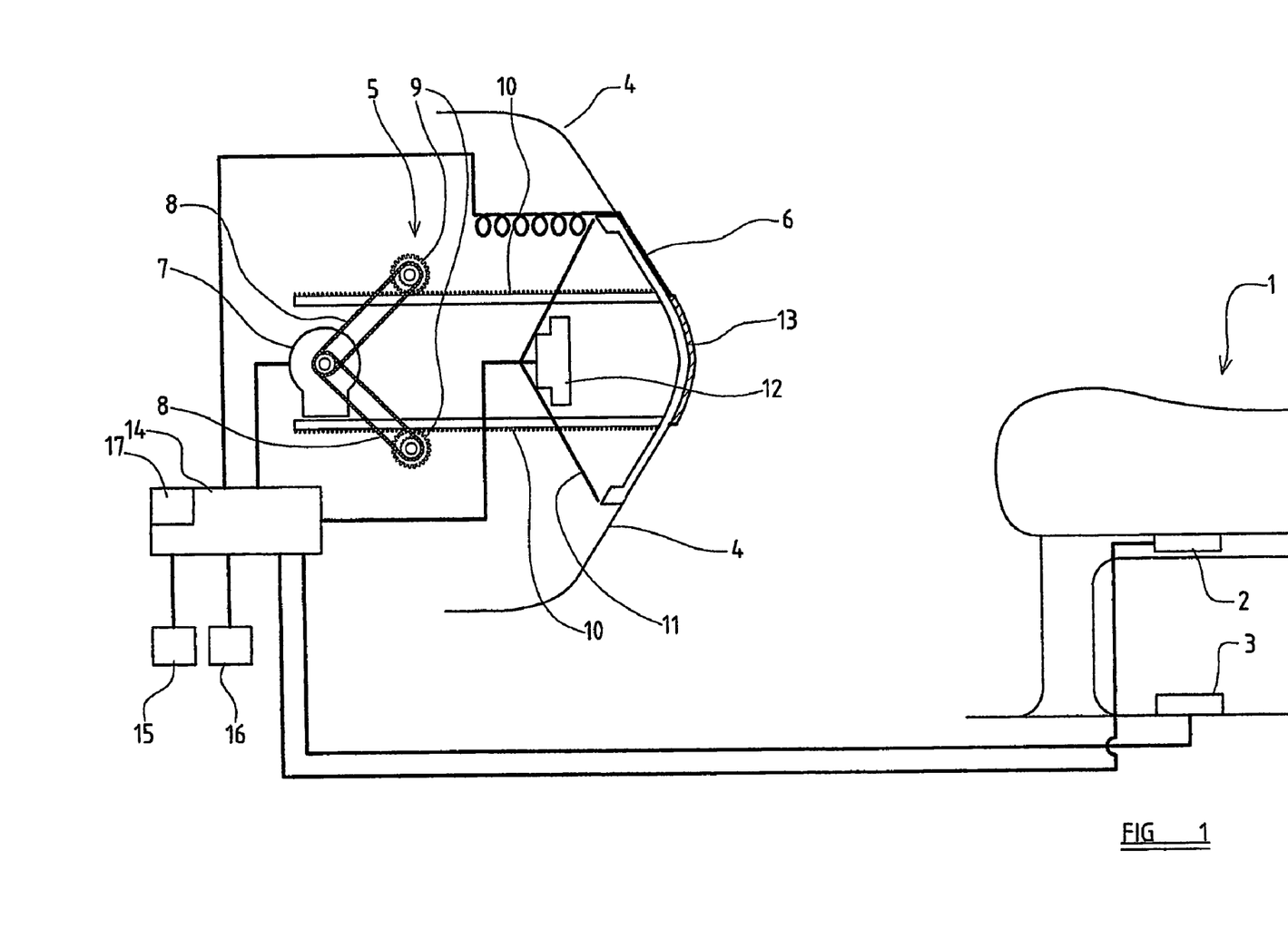
FIG. 1 is a schematic view of a vehicle seat and a dash board incorporating a safety arrangement in accordance with the present invention, with a blocking element in an initial position.

Referring initially to FIG. 1 of the accompanying drawings, a vehicle seat 1 incorporates a weight sensor 2, that is able to detect the presence and weight of an occupant of the seat 1, the seat 1 also has a seat position sensor 3 able to sense the position of vehicle seat 1 relative to the longitudinal axis of the vehicle. The seat 1 is located in front of a dashboard 4.

The dashboard 4 is provided with a safety arrangement 5. The safety arrangement 5 includes a moveable front panel 6 that is initially flush with the front surface of the dashboard 4, as shown in FIG. 1.

The safety arrangement 5 incorporates a reversible motor 7 which is mounted in position behind the dashboard 4 and which has an output shaft which is mechanically connected by drive chains 8 to two spaced apart cogs 9, which are also mounted in position behind the dashboard 4. Drive belts may be used as an alternative to drive chains. Each cog 9 is in driving engagement with a respective rack 10, and each rack 10 had one end thereof fixed to the inner face of the front panel 6. The front panel 6 together with the racks 10 constitute a moveable blocking unit which can be moved to a position in which it blocks movement of the knees of a seat occupant.

In use, the motor 7 imparts a rotational movement to the cogs 9, via the drive chains 8. As the cogs 9 rotate they cause the racks 10 to move in a horizontal direction. The racks 10 move the front panel 6 outwardly from dashboard 4, in a direction towards the seat 1, from the initial position, as shown in FIG. 1, to an operative position, in which the front panel 6 engages the knees of a seat occupant to resist forward movement of the seat occupant.

Mounted in position behind the dashboard 4 and the front panel 6 is a holding member 11, that is of hollow conical shape. An air-bag unit 12 is fixed to the centre of the front face of holding member 11, between the holding member 11 and the inner face of the front panel 6.

While a single stage gas generator may be used, in this embodiment the air-bag unit 12 has a two stage gas generator to inflate the air-bag. Each of the two stages can generate a different volume of gas enabling the air-bag to be inflated to different pressures depending upon which stages are actuated.

A contact sensor 13 is mounted on the outer face of the front panel 6, to generate a signal when the front panel 6 engages the knees of a seat occupant as the front panel 6 moves towards its operative position.

The output of the contact sensor 13 is connected to a controller 14. The controller 14 is electrically connected to receive signals from the weight sensor 2, and the seat position sensor 3 associated with the seat 1. The controller is also connected to receive a signal from a pre-crash sensor 15. The pre-crash sensor 15 may be in the form a camera mounted on the front of the vehicle, to detect if a crash may be about to occur.

Additionally the controller 14 is connected to a crash sensor 16, which may be an acceleration sensor. The signal from the crash sensor 16 may indicate the degree of severity of a crash.

The controller 14 incorporates a timer 17.

The controller 14 has outputs connected to the motor 7 and the air-bag unit 12 so that the controller can control the operation of the motor 7 and the deployment of the air-bag.

In use, if the pre-crash sensor 15 detects that a crash may be about to occur, the pre-crash sensor 15 sends a first signal to the controller 14. If the signal from the weight sensor 2 indicates the presence of a seat occupant the controller 14 actuates the motor 7.

The motor 7, when actuated, turns the cogs 9, which drive the racks 10 in a horizontal direction towards seat 1. The blocking unit constituted by racks 10, together with the front panel 6, is moved outwardly from the dashboard 4 towards the knees of the seat occupant.

The controller 14, in response to the signal from the seat position sensor 3, selects the distance by which the blocking unit is driven out from the dashboard 4. If the seat 1 is in a forward position the blocking unit is only driven out from the dashboard 4 by a short distance, but if the seat 1 is in a rearward position the blocking unit is driven out from the dashboard 4 by a greater distance.

If, during this outward movement of the blocking unit the contact sensor 13 comes into contact with the knees of a seat occupant the contact sensor 13 sends a signal to the controller 14. The controller 14 then halts the motor 7 to stop the blocking unit from being driven out further. This helps prevent the blocking unit exerting a substantial force on the knees of the seat occupant, which may otherwise cause the seat occupants feet to be pushed off the vehicle pedals (if the seat occupant is the driver), causing a hazardous situation.

Figure 2:
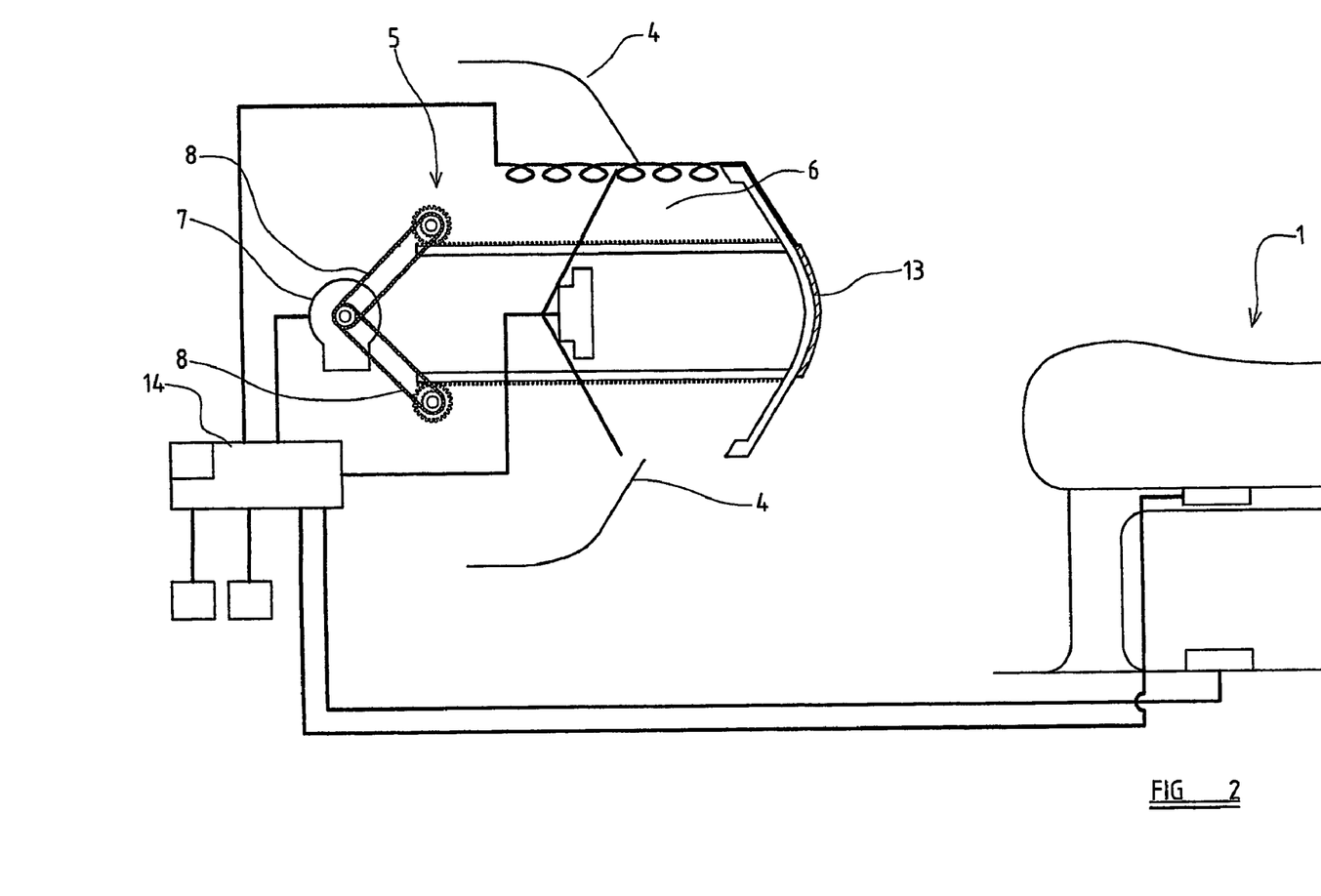
FIG. 2 is a schematic view of the safety arrangement, with the blocking element in an operative position.

Once the blocking unit has reached an operative position, as shown in FIG. 2, the timer 17 within controller 14 is started.

If no crash is detected by crash sensor 16, before the timer 17 measures a predetermined time, the controller 14 actuates the motor 7 to rotate in a reverse direction, so that the blocking unit is withdrawn back to its initial position, as shown in FIG. 1. The cycle of operation may then repeat if the pre-crash sensor 15 senses another potential crash.

However, if a crash is detected by crash sensor 16, before the timer 17 measures the predetermined time, the controller 14 responds to the signal sent from the crash sensor 16 to the controller 14, which is indicative of the severity of the crash.

The controller 14, in response to the signal indicative of the severity of the crash, and also in response to a signal from weight sensor 2 in seat 1, determines which of the stages in the two stage gas generator are to be deployed, and the preferred instant of deployment. The controller 14 then generates the appropriate control signal or signals which are sent to the air-bag unit 12. The air-bag is thus inflated.

Figure 3:
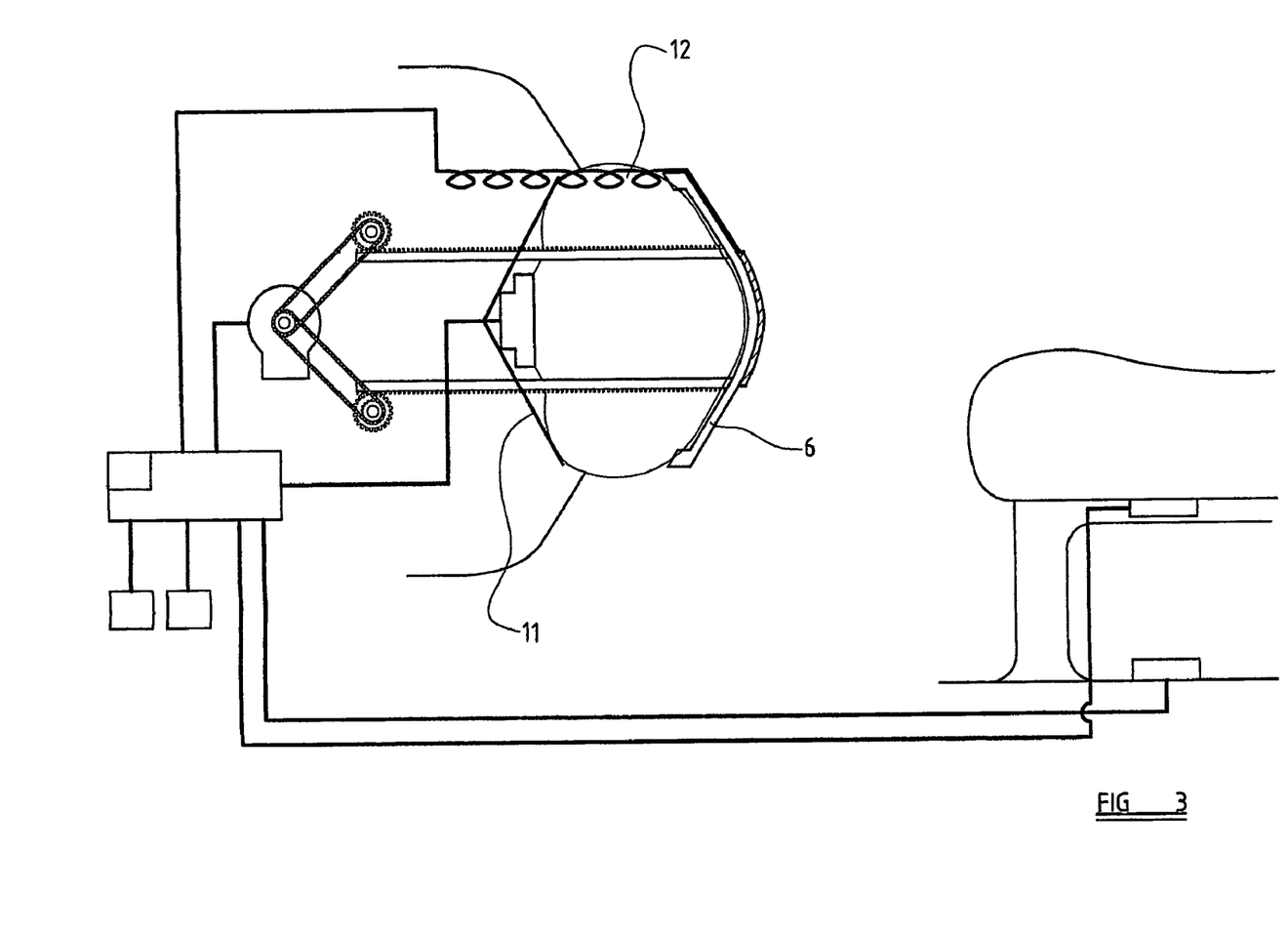
FIG. 3 is a schematic view of the safety arrangement having the blocking element in a operative position, and an inflatable element having been inflated.

As the air-bag is inflated it expands outwardly from air-bag unit 12 and is directed forwardly by holding member 11 towards the front panel 6, which is in the forward position. Once inflated, the air-bag is held in position between the holding member 11 and the inner face of the front panel 6, as shown in FIG. 3. The inflated air-bag thus forms an energy absorbing element which will absorb energy as the knees of the seat occupant move forwardly and apply a force to the blocking unit to move it from its operative position. Also the racks 10 will deform as force is applied to the blocking element by the knees of the seat occupant, also absorbing energy.

If the weight sensor 2 indicates that the seat occupant is of light weight the air-bag is inflated to a low pressure. This is achieved by only actuating a stage of the gas generator that generates a small volume of gas. If the weight sensor 2 indicates that the seat occupant is of medium weight the air-bag is inflated to a medium pressure. This is achieved by only actuating the other stage of the gas generator, that generates a larger volume of gas. If the weight sensor 2 indicates that the seat occupant is heavy the air-bag is inflated to a high pressure. This is achieved by actuating both of the stages in the gas generator, to generate a very large volume of gas. This helps ensure that the air-bag provides an energy absorbing characteristic that is appropriate for the weight of the seat occupant.

If the crash sensor 16 indicates that the crash is severe the controller 14 actuates the air-bag unit quickly so as to inflate the air-bag relatively early during the accident. Alternatively, if the crash sensor 16 indicates that the crash is only gentle the controller 14 actuates the air-bag unit at a later instant during the accident. This helps ensure that the air-bag is inflated at the correct time to absorb energy when the seat occupant moves forwardly against the blocking unit.

After the crash has occurred, and the safety arrangement 5 has offered protection to the seat occupant, the motor 7 is actuated so that the blocking unit is withdrawn to allow the occupant to move and exit the vehicle. Thus, after an appropriate period of time has been measured by the timer 17 the controller 14 actuates the motor 7 to rotate in a reverse direction to withdraw the blocking unit back to its initial position.

Figure 4:
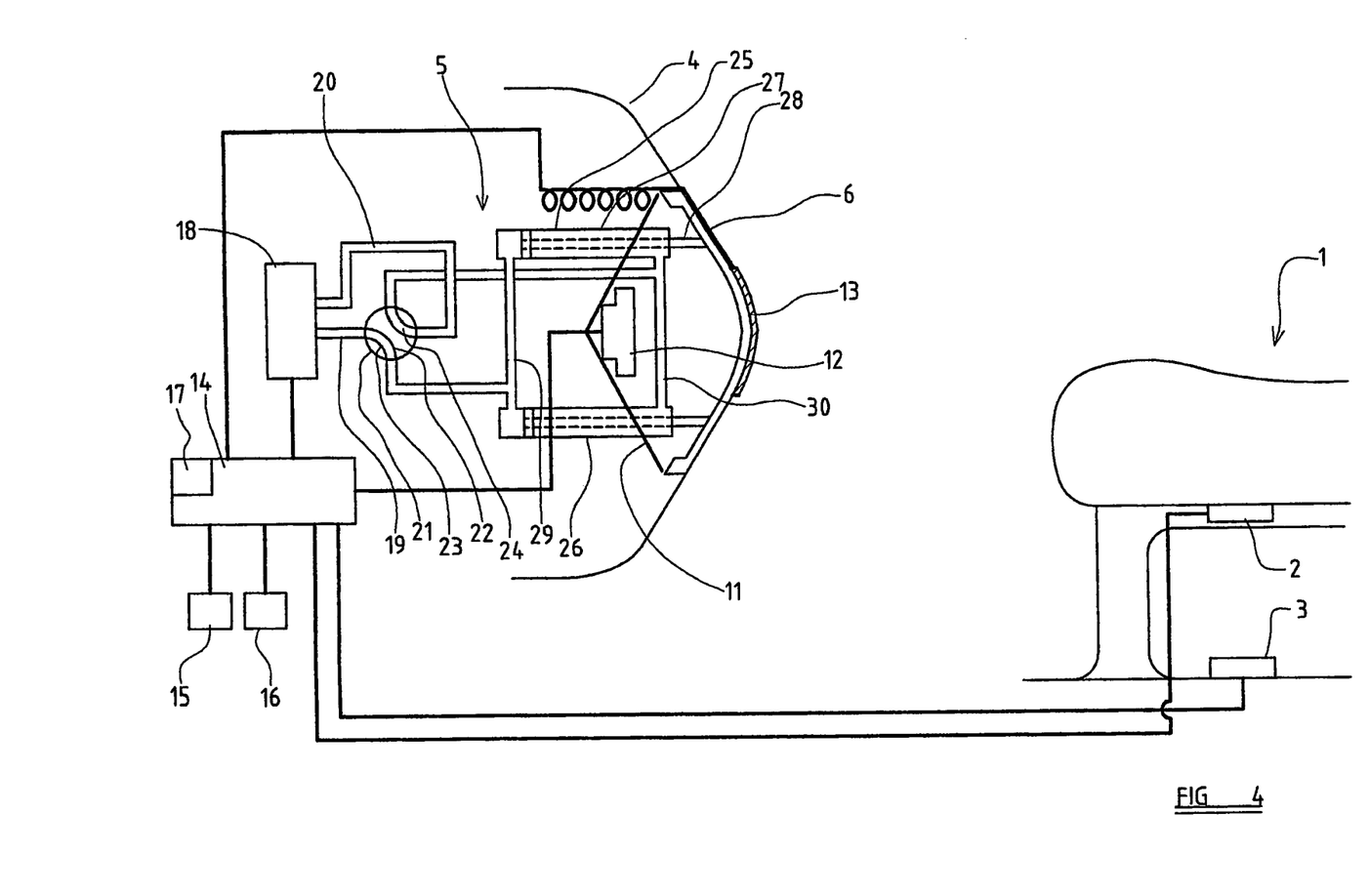
FIG. 4 is a schematic view of an alternative embodiment of the present invention, incorporating a cylinder and piston arrangement to form a reversible drive with the blocking element being shown to be in an initial position.
Figure 5:
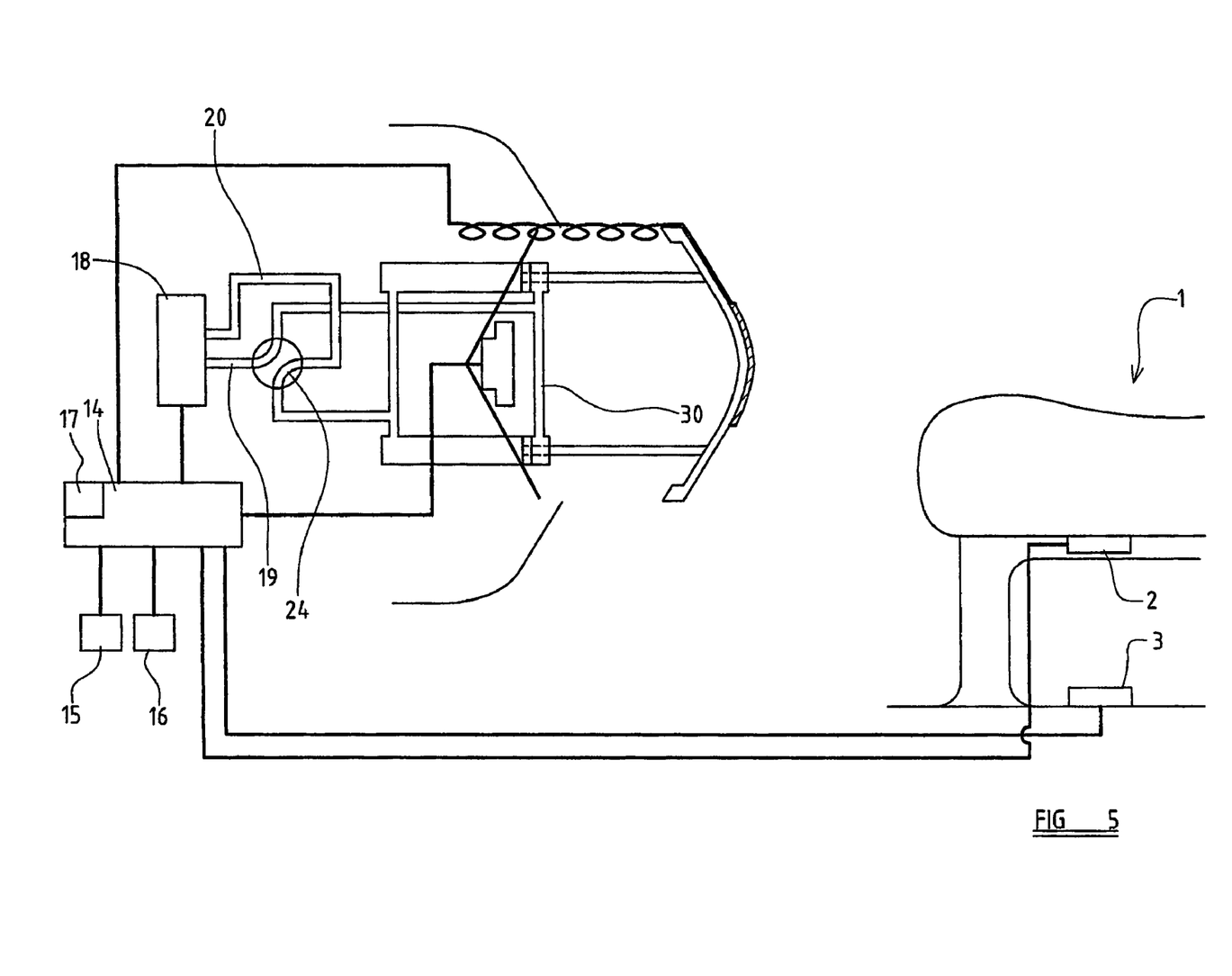
FIG. 5 is a schematic view of the embodiment shown in FIG. 4, with the blocking element in an operative position.

An alternative embodiment of the invention is shown in FIGS. 4 and 5. In this embodiment the safety arrangement 5 incorporates a pump 18 which is mounted behind the dashboard 4. The pump 18 is provided with an inlet port 19 and an outlet port 20. The inlet port 19 and the outlet port 20 are connected to two ports of a four way control valve 21 which incorporates a rotor 22, the rotor defining two separate flow passages 23, 24.

The four way control valve has two further ports, the further ports being connected to a pair of double acting piston and cylinder units 25, 26. The piston and cylinder units are of identical design, each having an outer cylinder 27 and an inner piston 28, the piston 28 being connected to the moveable panel 6. Each cylinder is provided with a first inlet/outlet 29 at one end thereof, and second inlet/outlet 30 at the other end thereof.

It can be seen that, with the rotary element 22 of the four way control valve 21 in one position, as shown, the inlet/outlet 29 of each of the piston and cylinder units is connected to the inlet 19 of the pump 18 whilst the inlet/outlet 30 is connected to the outlet 20 of the pump 18. With the control valve of this orientation the pump 18 will tend to drive the pistons to the left as shown thus maintaining the moveable front panel 6 in the retracted position as shown.

If the rotatable element 22 is rotated by 90°, as shown in FIG. 5, the pump inlet 19 will then be connected to the inlet/outlet 30 of each piston and cylinder unit whilst the pump outlet 20 will be connected to the inlet/outlet 29 of each piston and cylinder units. Thus the pump will operate to drive the pistons 28 out of the cylinders 27, thus moving the panel 6 forwardly. It is to be understood that by controlling actuation of the pump and the position of the control valve a panel 6 may be selectively driven forwardly or rearwardly.

The embodiment of FIGS. 4 and 5 will operate in a manner equivalent to that of FIGS. 1 to 3. In an accident situation energy may be absorbed by the air-bag, and by the piston and cylinder units.

Although the safety arrangement 5 shown in FIGS. 4 and 5 incorporates an air-bag unit 12, it is to be appreciated that the air-bag unit 12 may be omitted. Instead, solely the cylinders 27 and pistons 28 may form an energy absorbing element which absorbs energy as the blocking unit is moved from the operative position by the knees of the seat occupant.

Figure 6:
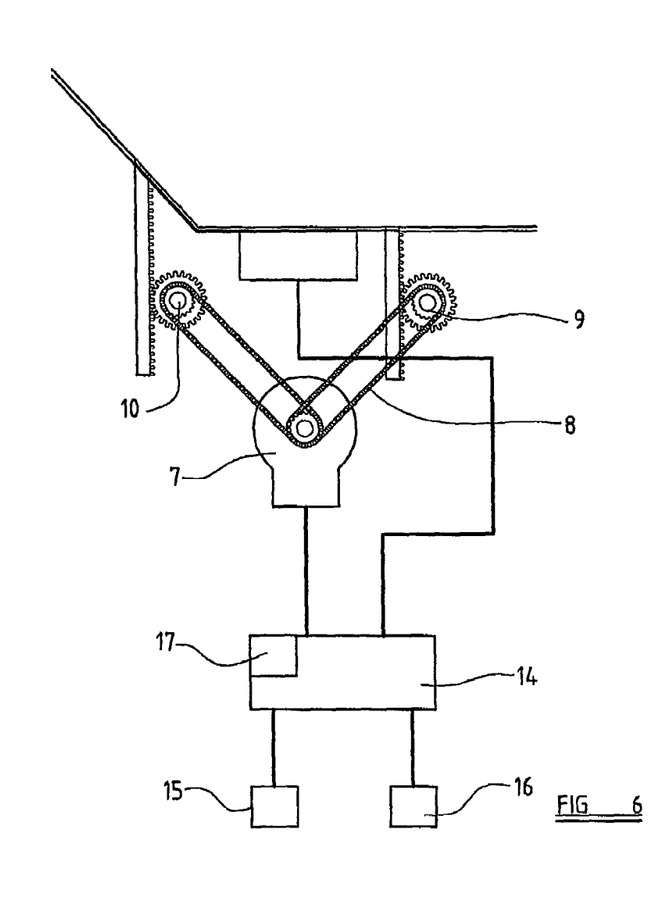
FIG. 6 shows a schematic view of a further embodiment of the present invention, with the safety arrangement situated beneath the floor plan of a vehicle, and with the blocking element in an initial position.
Figure 7:
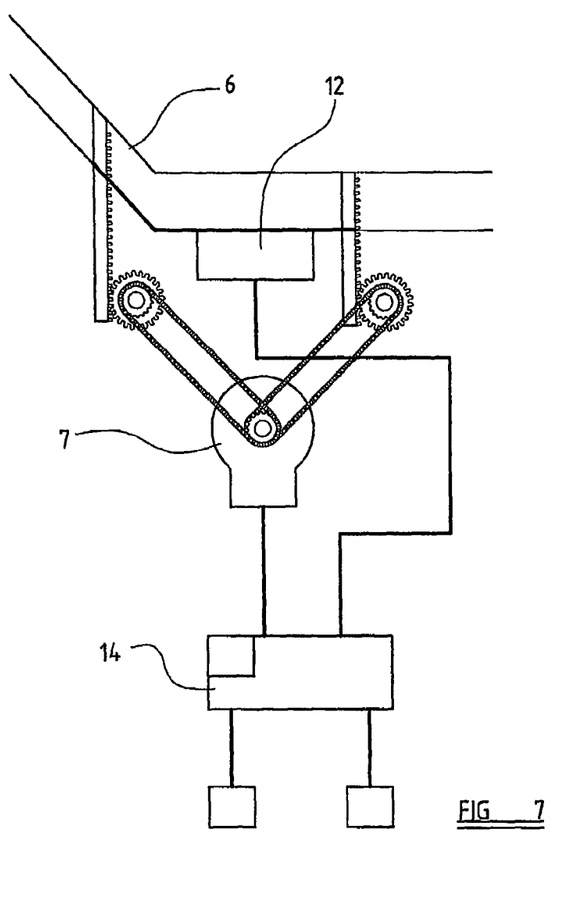
FIG. 7 is a schematic view of the embodiment shown in FIG. 6, with the blocking element in an operative position.

A further embodiment of the present invention is shown in FIG. 6, in which the safety arrangement 5 is situated beneath the floor pan of a motor vehicle, to protect the feet and ankles of a seat occupant in the event of a crash. The operation of the safety arrangement 5 shown in this alternate embodiment is very similar to that of the safety arrangement 5 in the preferred embodiment, but the front panel 6 is a panel that is over the floor of the vehicle, and which has a shape corresponding to the shape of the footwell of a vehicle. FIG. 6 shows the blocking unit (front panel 6 and racks 10) in an initial position, and FIG. 7 shows the blocking unit in an operative position.

Figure 8:
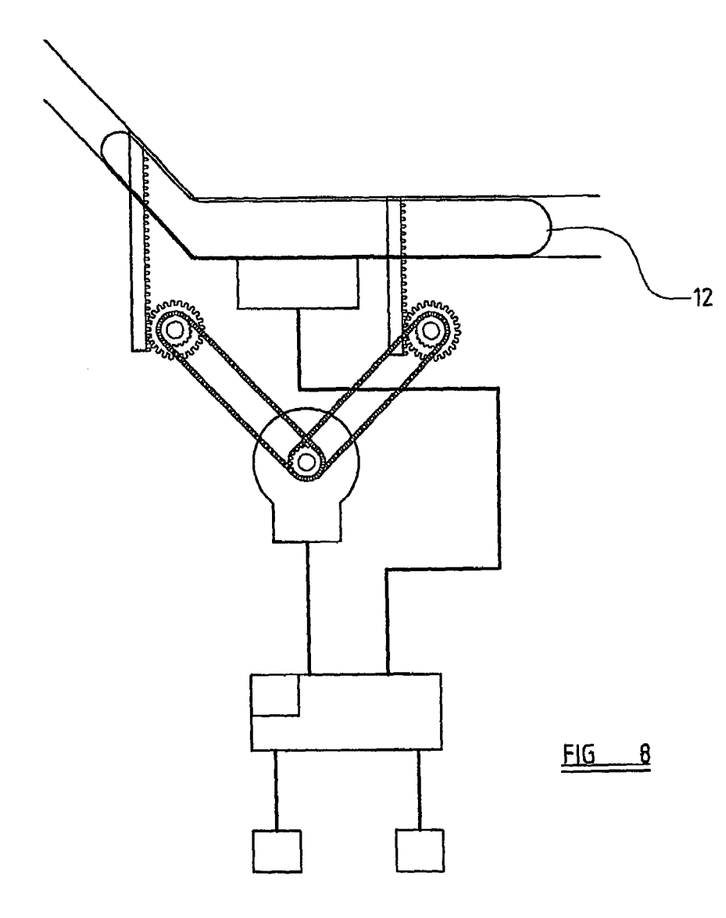
FIG. 8 is a schematic view of the embodiment shown in FIG. 6, with an inflatable element having been inflated.

FIG. 8 shows the safety arrangement 5 in accordance with this alternate embodiment, with an air-bag having been inflated to form an energy absorbing element behind the blocking unit. The air-bag absorbs energy from shock waves which may travel along the floor of the vehicle in the event of a crash, thus helping prevent energy being transferred to the feet of a seat occupant.

It is to be appreciated that although safety arrangements in accordance with the present invention have been shown to offer front protection for a seat occupant and protection for below the seat occupant's feet, a safety arrangement in accordance with the present invention may be used to help protect a seat occupant in a side impact situation, and thus may be mounted on the side of the vehicle adjacent a seat, or may be mounted in a side part of the seat. Also in one embodiment the safety arrangement may be mounted in the front part of a vehicle seat to protect the seat occupant from sub-marining. A safety arrangement in accordance with the present invention may also be situated on the exterior of the vehicle, to help protect a pedestrian in the event of a crash.

The invention has been described with reference to embodiments in which the reversible drive includes a rock, or a piston and cylinder unit. In other embodiments the reversible drive may include an eccentric element or a driven linkage.

In the present Specification "comprises" means "includes or consists of" and "comprising" means "including or consisting of".

The invention claimed is:

1. A safety arrangement for use in a motor vehicle, the safety arrangement incorporating a blocking unit and a reversible drive to drive the blocking unit, in response to a first signal, from an initial position to an operative position, the drive being associated with a timing arrangement to control the drive to return the blocking unit to the initial position after a pre-determined period of time, the arrangement incorporating an energy absorbing element operative to absorb energy as the blocking unit is moved from the operative position by an applied force, wherein the energy absorbing element is an inflatable element that is inflated in response to a second signal occurring after the first signal.

2. A safety arrangement according to claim 1 wherein a pre-crash sensor is provided and the first drive signal is generated in response to the sensing of a potential crash by the pre-crash sensor.

3. A safety arrangement according to claim 1 wherein the reversible drive incorporates a rack.

4. A safety arrangement according to claim 1 wherein the reversible drive incorporates a piston and cylinder unit.

5. A safety arrangement according to claim 1 wherein the blocking element incorporates a contact sensor to supply a signal when the blocking element is moved into contact with an object to stop the blocking unit from being driven further towards the operative position.

6. A safety arrangement according to claim 1 wherein a crash sensor is provided and the second signal is generated in response to sensing of a crash by the crash sensor.

7. A safety arrangement according to claim 6 wherein the crash sensor indicates a degree of severity of the crash.

8. A safety arrangement according to claim 1 wherein the safety arrangement provides front protection for a seat occupant in the event of a crash.

9. A safety arrangement according to claim 1 wherein a seat is provided with a sensor to sense a parameter.

10. A safety arrangement according to claim 9 wherein the sensor is able to detect the presence and weight of an occupant in the seat.

11. A safety arrangement according to claim 9 wherein the sensor is a seat position sensor, able to sense the position of the seat in the direction of the longitudinal axis of the vehicle.

12. A safety arrangement according to claim 1 wherein the inflatable element is inflated by a multistage gas generator, the gas generator being controlled by a controller responsive to sensed parameters.

13. A safety arrangement according to claim 1 wherein the energy absorbing element is part of the drive.

14. A safety device for use in a motor vehicle, the safety device comprising:
   a blocking unit including an inflatable safety device;
   a driving unit for moving the blocking unit from an initial position to an operative position in response to a first signal, the driving unit returning the blocking unit to the initial position after a predetermined time;
   a contact sensor attached to the blocking unit providing a second signal upon contact with an occupant of the motor vehicle, the second signal causing the driving unit to cease movement towards the operative position; and
   the inflatable safety device inflating in response to a third signal indicating a vehicle crash.

15. The safety device of claim 14 wherein the first signal is generated in response to sensing of a potential crash by a pre-crash sensor.

16. The safety device of claim 14 wherein the reversible drive incorporates one of a rack unit and a piston/cylinder unit.

17. The safety device of claim 14 wherein the third signal is generated by a crash sensor indicating a degree of severity of the vehicle crash.

18. The safety device of claim 14 further comprising a seat sensor operable to detect at least one of a presence of the occupant in a vehicle seat, a weight of the occupant in the vehicle seat, and a position of the vehicle seat along a longitudinal axis of the motor vehicle.

19. The safety device of claim 14 wherein the inflatable safety device is inflated by a multistage gas generator, the gas generator being controlled by a controller responsive to sensed parameters.

* * * * *